(12) United States Patent
Mikan

(10) Patent No.: US 8,112,126 B2
(45) Date of Patent: Feb. 7, 2012

(54) SYSTEM AND METHOD FOR CHANGING INSTANT MESSAGING PRESENCE OF A USER PROFILE RELATIVE TO THE ACTIVE CALL MODE OF A COMMUNICATION DEVICE

(75) Inventor: Jeffrey Clinton Mikan, Cumming, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 529 days.

(21) Appl. No.: 10/313,130

(22) Filed: Dec. 6, 2002

(65) Prior Publication Data
US 2004/0110543 A1 Jun. 10, 2004

(51) Int. Cl.
*H04W 4/00* (2009.01)

(52) U.S. Cl. ........ 455/574; 455/572; 455/466; 455/418; 715/803; 715/810

(58) Field of Classification Search ............ 455/574, 455/435.1, 418, 466, 572; 715/803, 810
See application file for complete search history.

(56) References Cited

U.S. PATENT DOCUMENTS

| | | | |
|---|---|---|---|
| 6,816,719 B1 | 11/2004 | Heinonen et al. | |
| 7,076,043 B2 * | 7/2006 | Curbow et al. | 379/201.06 |
| 2002/0087704 A1 * | 7/2002 | Chesnais et al. | 709/228 |
| 2002/0098855 A1 * | 7/2002 | Hartmaier et al. | 455/466 |
| 2002/0184089 A1 * | 12/2002 | Tsou et al. | 705/14 |
| 2003/0112931 A1 * | 6/2003 | Brown et al. | 379/93.23 |
| 2003/0182391 A1 * | 9/2003 | Leber et al. | 709/217 |
| 2004/0203768 A1 * | 10/2004 | Ylitalo et al. | 455/435.1 |

* cited by examiner

*Primary Examiner* — Pierre-Louis Desir

(74) *Attorney, Agent, or Firm* — Moazzam & Associates, LLC

(57) ABSTRACT

The present invention is a method and system for changing the presence of a user profile logged into a communication device on a communications network relative to the active call mode of the communication device. In the first embodiment, the communication device first receives an indication that an event involving the communication device has triggered active call mode. The communication device next determines the new presence corresponding to the event triggering active call mode, and communicates the new presence to the communications network. In the second embodiment, the communication device is coupled to a client device. The client device receives an indication that an event involving the communication device has triggered active call mode and determines the new presence for the user profile corresponding to the event. The new presence for the user profile logged into the communication device is then communicated to the communications network.

9 Claims, 5 Drawing Sheets

SYSTEM AND METHOD FOR CHANGING INSTANT MESSAGING PRESENCE OF A USER PROFILE RELATIVE TO THE ACTIVE CALL MODE OF A COMMUNICATION DEVICE

FIELD OF THE INVENTION

The present invention generally relates to the field of telecommunications, and more particularly, relates to a system and method for changing instant messaging presence of a user profile on a communications network relative to the activity of a communication device.

BACKGROUND OF THE INVENTION

Instant messaging services, accessible via a computer device or other communication device, enable users of such services to exchange messages or information with each other in near real-time. A feature of instant messaging services is a personal list, sometimes referred to as a "buddy list," which includes identification of other users with whom the user frequently communicates via the instant messaging services. The availability status of other users on the personal list, known as the instant messaging presence of each user, includes not only "online" or "offline," but user-controlled statuses such as "be right back," "at work," or "eating dinner." Generally, these user-controlled statuses may be changed in response to an action received by the user interface, such as receipt of a selection of an instant messaging presence via a drop-down menu presented on the display of the communication device, or another method in response to a user input.

Because communication devices are being developed which will have instant messaging capability and the capability to initiate and receive voice calls, a user will be susceptible to receiving instant messages during a call on the communication device. This may prove irritating and distracting to a user attempting to concentrate on the call. To prevent this irritation, the user could change the instant messaging presence of the particular user profile to "unavailable" before making or placing a call. However, this process takes time, and therefore, may be difficult to do quickly before answering an incoming call. Thus, the user is susceptible to becoming needled with countless instant messages after answering an incoming call unless the user can change the instant messaging presence quickly enough before answering the call.

Hereinafter, the term "active call mode" will be used to refer to a set of events involving utilization of the communication device, such as receipt of an incoming call, initiation of an outgoing call, receipt of a data transmission such as a facsimile, involvement in a chat session, involvement in an Internet session, involvement in email activity, or initiation of any other type of data transmission. The events constituting active call mode may be programmed into the communication device or client device by a user. The events may also be preprogrammed into the communication device or client device. Once the event triggering active call mode is completed, the communication device exits active call mode and returns to an idle mode.

In another situation, a communication device may be coupled to a client device. An example of this embodiment includes a personal computer with telephonic capabilities incorporated within the functionality of the computer, wherein the telephonic capabilities may be operated via the user interface of the personal computer. Another example of this embodiment includes a wireless device communicatively coupled to another device such as a personal digital assistant device ("PDA" device), wherein the user may control the operation of the communication device via the interface of the PDA device.

In this second embodiment, a user may change instant messaging presence once a call is placed or received via a user interface of the client device. This process also inconveniences the user wanting privacy during a call, for the user must take the additional step of changing the instant messaging presence via the client device each time the user places or receives a call. Otherwise, other users will not know that the user is on a call, and may irritate the user by sending an instant message. This process may prove exceptionally burdensome if the client device is not in close proximity to the communication device.

Therefore, there is a need in the art for a system and method for changing the instant messaging presence of a user profile logged into a communication device relative to a communication device entering active call mode. There is also a need for an implementing this feature in such a way that the user, after placing or receiving a call, is not required to take the step of changing the instant messaging presence of the communication device, even when the communication device is coupled to a client device.

SUMMARY OF THE INVENTION

Generally stated, the present invention provides a method and apparatus for changing the instant messaging presence of a user profile logged into a communication device. In particular, the present invention provides a method and system for changing the instant messaging presence of a user profile logged into a communication device on a communications network when the communication device is in active call mode.

In the first embodiment, the method first comprises the steps of receiving an indication that an event involving the communication device has triggered active call mode. The events that trigger active call mode may be programmed by the user into the communication device or may be preprogrammed into the communication device. These events may include, but are not limited to, receipt of an incoming call, initiation of an outgoing call, receipt of a data transmission, initiation of a data transmission, or engagement in an instant messaging session. After receiving the indication that an event involving the communication device has triggered active call mode, the instant messaging presence for the user profile logged into the communication device changes to the presence associated with the particular event.

In the second disclosed embodiment, the method includes changing the presence of the user profile in response to an indication of a call received by the communications network from a client device, such as a personal computer, that is communicatively linked to a communication device. Once the communication device places or receives a call, or engages in another activity designated under active call mode, the client device communicates the new presence associated with active call mode to the communications network.

Therefore, it is an object of the present invention to provide a rapid and user friendly process for changing the instant messaging presence of a user profile logged into a communication device on a communications network relative to an event triggering the active call mode of a communication device.

It is also an object of the present invention to provide a process for changing the instant messaging presence of a user profile logged into a communication device relative to an event triggering the active call mode of a communication device when the communication device is coupled to a client device.

It is a further object of the present invention to provide a system for changing the presence of a user profile logged into a communication device on a communications network relative to an event triggering the active call mode of a communication device.

That the present invention and the disclosed embodiments thereof overcome the drawbacks set forth above and accomplish the objects of the invention set forth herein will become apparent from detailed description of the present invention to follow.

DETAILED DESCRIPTION OF THE INVENTION

Reference will now be made in detail to the first and second embodiments of the invention, examples of which are illustrated in the accompanying drawings. Wherever possible, the same reference numbers will be used throughout the drawings to refer to the same or like parts. Generally stated, the present invention provides a method and system for changing the presence of a user profile logged into a communication device on a communications network. In particular, the present invention provides a method and system for changing the presence of a user profile logged into a communication device on a communications network relative to the active call mode of a communication device.

Figure 1:
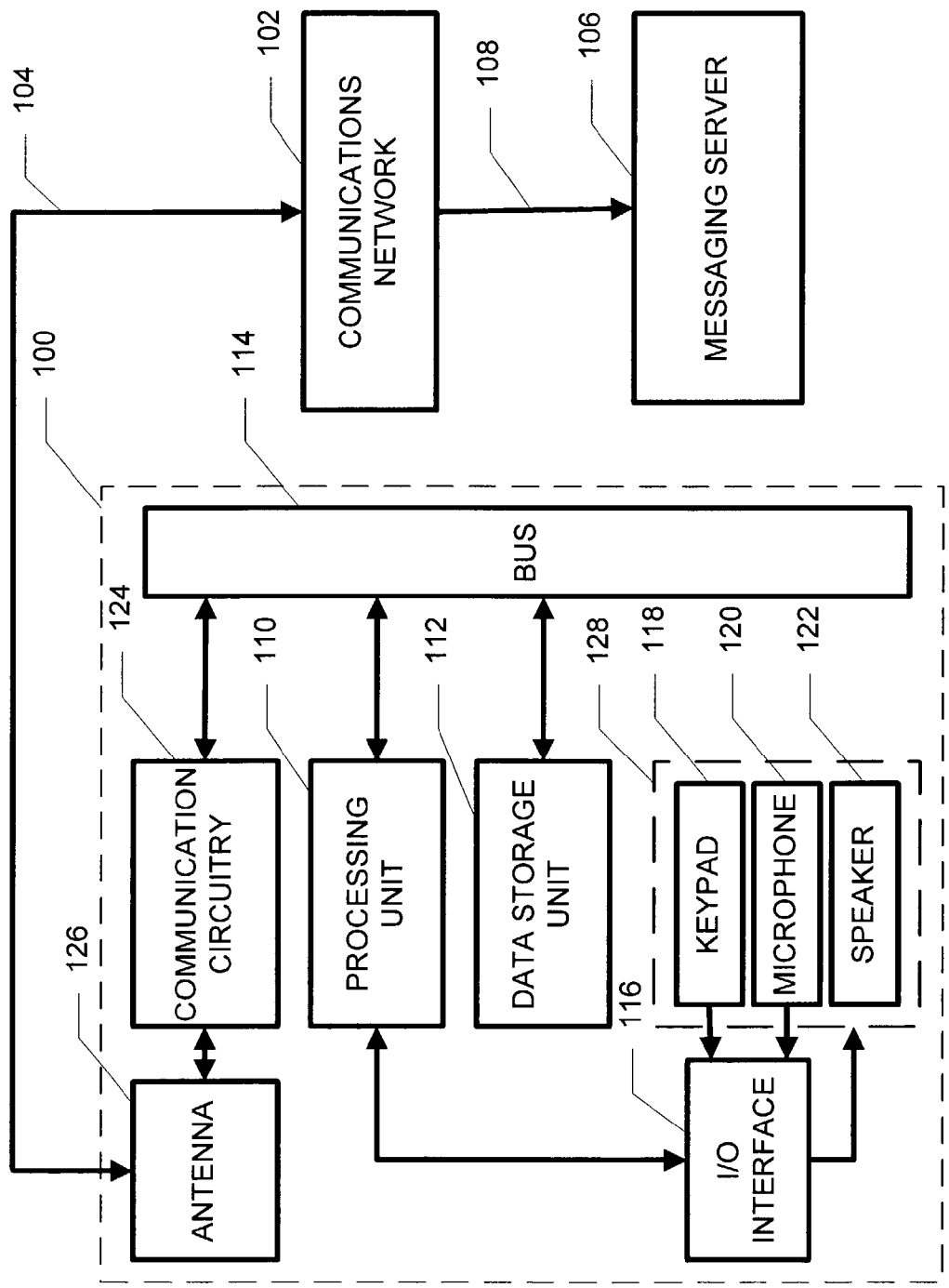
FIG. 1 is a block diagram representation illustrating an exemplary system in accordance with the first embodiment of the present invention.

FIG. 1 is an overall system diagram illustrating the exemplary system in accordance with the first embodiment of the present invention. The communication device 100 places and receives calls with communications network 102, in addition to any other communications, via a bi-directional communications link 104. Messaging server 106 may also communicate with communication device 100, and is coupled to communications network 102 via a bi-directional communications link 108.

Communication device 100 may be any device capable of receiving and transmitting data. In the first and second embodiments of the present invention, this communication device 100 is a mobile device. Communication device 100 contains a processing unit 110 that is communicatively coupled to the other components of the communication device 100 via a bus 114.

Figure 2:
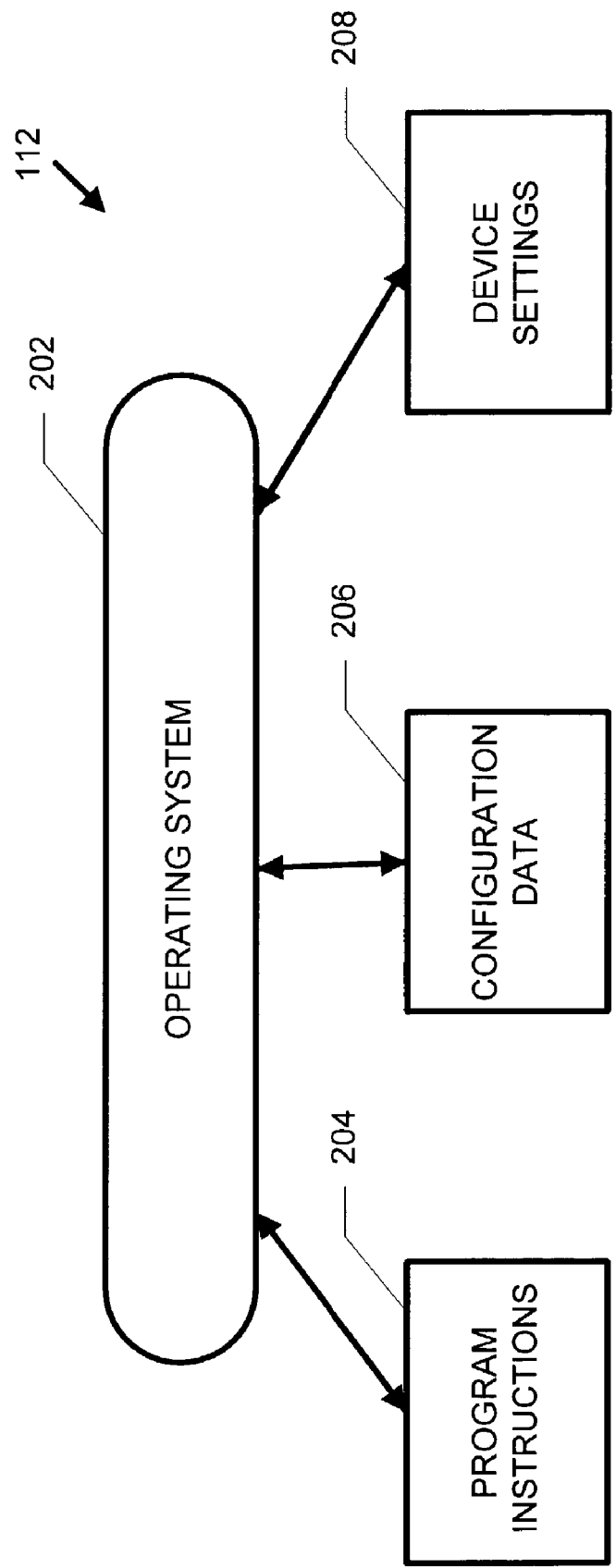
FIG. 2 is a block diagram representation of the data storage unit of the communication device in accordance with the first and second embodiments of the present invention.

Communication device 100 contains a data storage unit 112, which is discussed in greater detail in FIG. 2. Data storage unit 112 may be any type of memory, including but not limited to RAM, EPROM, or EEPROM memory, and may store either volatile or non-volatile memory. The processing unit 110 and the data storage unit 112 may communicate via a system bus 114. Alternatively, the processing unit 110 and the data storage unit 112 may be included on the same microprocessing chip.

Communication device 100 also includes I/O interface 116, which may reside on the same microprocessing chip as the processing unit 110. However, I/O interface 116 may also reside on an external unit. I/O interface 116 connects the processing unit 110 to a user interface 128. In the case of a wireless device such as a cellular telephone, user interface 128 comprises keypad input 118, microphone input 120, and speaker output 122. The I/0 interface 116 may include an analog-to-digital converter for converting an analog microphone signal to a digital signal for use by the processing unit 110. I/O interface 116 may also include a digital-to-analog converter to convert digital information from the processing unit 110 to the speaker 122, such as voice data.

The processing unit 110 transmits and receives digital signals which are to be communicated outside the communication device 100 via the communication circuitry 124. In a cellular telephone embodiment, the communication circuitry 124 is connected to an antenna 126, which communicates signals through airwaves to communications network 102 via a bi-directional communication link 104. The bi-directional communications link 104 is established when a call is placed to or from the communication device 100, or when another activity included within active call mode occurs with communication device 100.

Communications network 102 includes various components required to enable communication between two or more communication devices, including wired connections, wireless connections, switches, and other devices for establishing communication in the network. Communications network 102 is also communicatively coupled to a messaging server 106 via a bidirectional communication link 108. The messaging server 106 may be any server providing messaging capabilities for communications devices interacting with the communications network, including but not limited to, an instant messaging client or another messaging server for a wireless services carrier.

FIG. 2 is a block diagram representation of the data storage unit 112 of the communication device in accordance with the first and second embodiments of the present invention. Data storage unit 112 comprises operating system 202, which contains instructions for operating the communication device 100. In addition to any other instructions, the program instructions unit 204 includes instructions for processing unit 110 to execute the methods disclosed in the first and second embodiments of the present invention. The configuration data unit 206 is included in the data storage unit 112, and contains configuration information regarding the assortment of components that make up the system of the present invention.

The data storage unit 112 also contains a device settings unit 208. The device settings unit 208 contains various parameters indicating the settings of the communication device 100, in addition to any other data. One of these parameters may include a value for indicating the presence associated with a particular event included within active call mode. Other device settings which may be stored in the device settings unit 208 include, but are not limited to, ring type, touch tone type, or appearance of the user interface 128.

Figure 3:
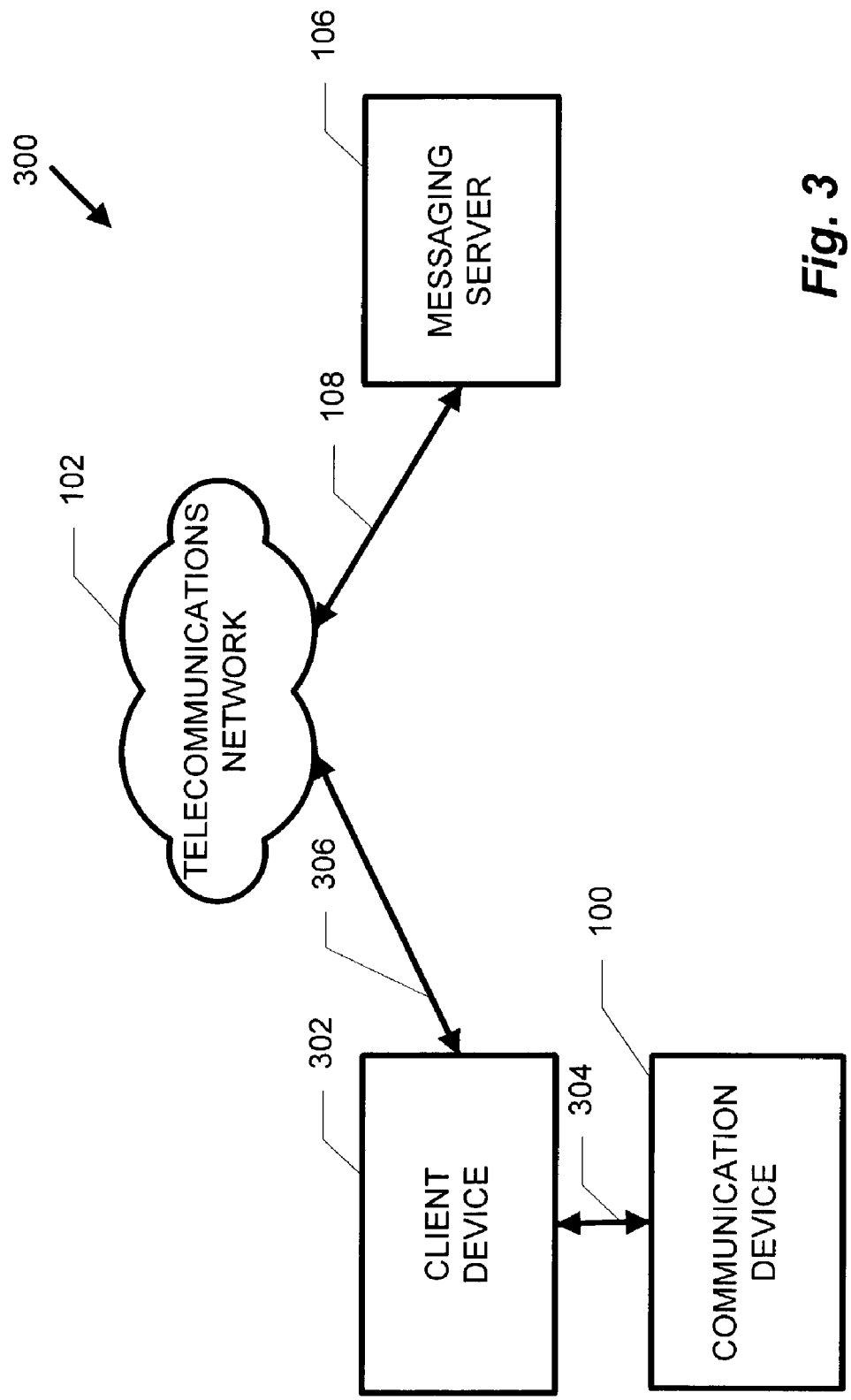
FIG. 3 is a block diagram representation of an exemplary system in accordance with the second embodiment of the present invention.

FIG. 3 is a block diagram representation of an exemplary system in accordance with the second embodiment of the present invention. System 300 involves a communication device 100 connected to a client device 302. In this second embodiment, the communication device 100 may be, but is not required to be, the same communication device 100 described in FIG. 1. Communication device 100 is connected via a bidirectional communications link 304 to client device 302. Bi-directional link 304 may be a wireless link, established via a wireless data transfer protocol such as the Bluetooth technology, or a wired connection.

The client device 302 contains substantially the same components as the communication device 100 as described in FIG. 1. However, the client device 302 may comprise any device capable of operating with a communication device 100 such as a personal computer or another wireless device. Bi-directional communication link 306 communicatively couples the client device 302 and the communications network 102. Bi-directional link 306 may be a wireless link, established via a wireless data transfer protocol such as the Bluetooth technology, or alternatively, a wired connection.

Messaging server 106 is server providing messaging capabilities for communication devices interacting with the communications network 102, including but not limited to, an instant messaging client or server for a wireless services carrier. The messaging server 106 communicates information, such as instant messaging presence or other information pertaining to a user profile, to the communications network 102 via bi-directional communications link 108. The information then is transmitted from the communications network 102 to the client device 302 via bidirectional communications link 306, which also may be a wired or wireless connection.

Figure 4:
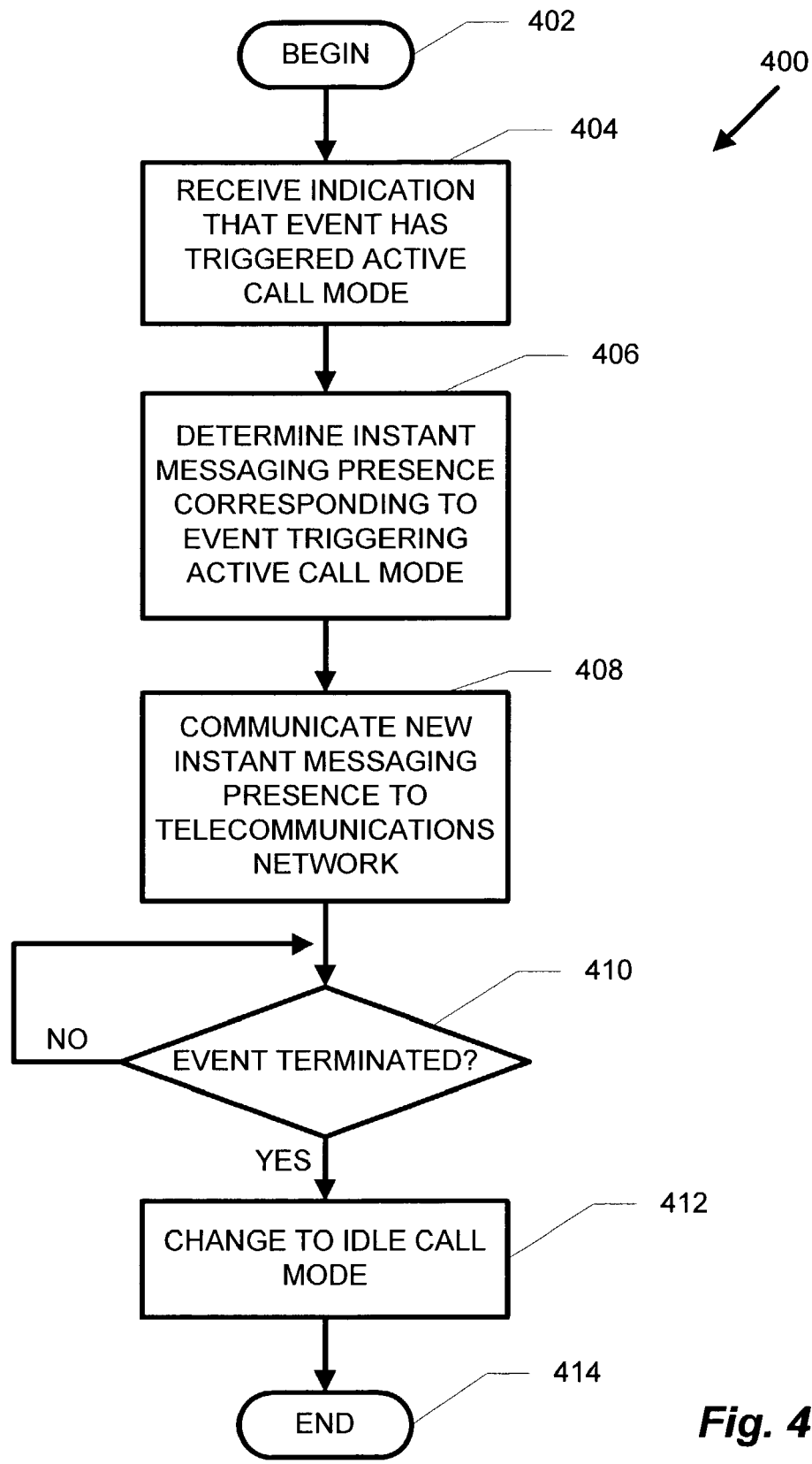
FIG. 4 is a flow diagram illustrating the method of the first embodiment of the present invention from the perspective of the communication device.

FIG. 4 is a flow diagram illustrating the method of the first embodiment of the present invention from the perspective of the communication device. Method 400 begins at step 402 and proceeds to the receipt of an indication that an event involving the communication device has triggered active call mode at step 404. More particularly, at step 404 the processing unit 110 receives an indication that one of the events included within the parameters of active call mode has taken place.

The generation of the indication may be in response to one of many events included within active call mode depending on the capabilities and functionality of the communication device 100, as well as user preferences programmed into communication device 100. These events include, but are not limited to, the use of communication device 100 to initiate a voice call, the receipt by communication device 100 of a voice call, the receipt of a data transmission by communication device 100, initiation of a data transmission by communication device 100, or engagement of communication device 100 in a chat session. The events included within active call mode may be programmed by the user via the user interface 128 or preprogrammed into the device settings unit 208 of the communication device 100.

At step 406, the communication device 100 determines the new presence corresponding to the event triggering active call mode. A different presence may be associated with each event included within active call mode, or a single presence can be associated with all events within active call mode. These presences, and the events encompassed within active call mode that are associated with each presence, may be stored in the memory of the communication device 100 in the device settings unit 208 of the data storage unit 112. However, these presences and the corresponding information regarding the events associated with each presence may also reside externally in an alternate memory coupled to the communication device 100.

At step 408, the communication device changes the presence of the communication device 100 to the new presence associated with the event triggering active call mode. This step involves communicating the new presence for the user corresponding to the event from the communication device 100 to the communications network 102. This information indicating the new instant messaging presence may be stored in a memory within messaging server 106. At step 410, the communication device 100 determines if the event triggering active call mode has terminated. If the event triggering active call mode has terminated, then at step 412 the communication device 100 changes its presence to idle call mode and communicates the idle call mode presence to the to the communications network 102. The method 400 concludes at step 414 after the presence of the communication device 100 is changed to idle call mode.

Figure 5:
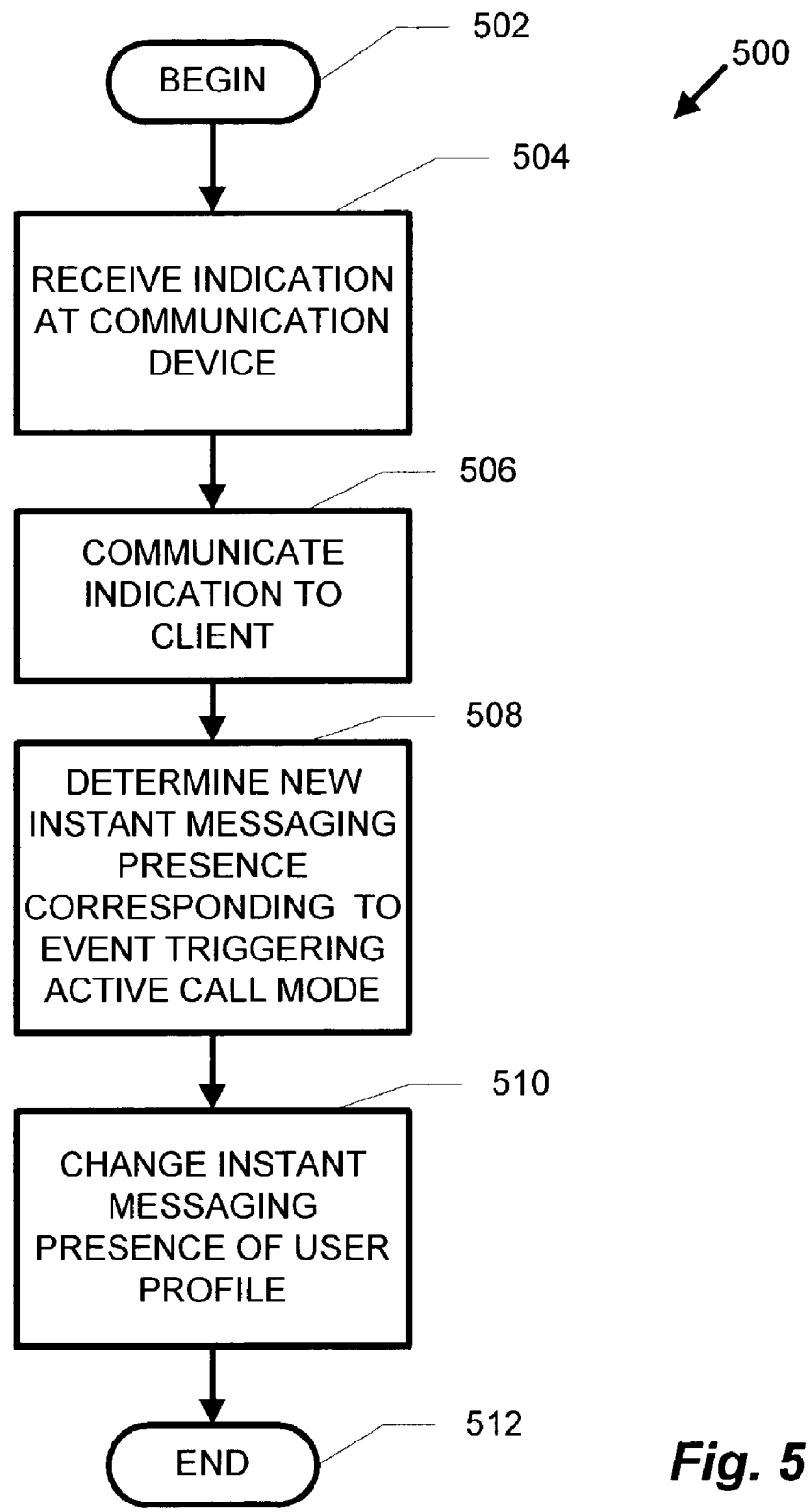
FIG. 5 is a flow diagram illustrating the method of the second embodiment of the present invention from the perspective of the system.

FIG. 5 is a flow diagram illustrating the method of the second embodiment of the present invention from the perspective of the system. Method 500 is utilized when the communication device 100 is connected to a client device 302 in accordance with the second embodiment of the present invention. After method 500 begins at step 502, the client device 302 receives an indication that an event triggering active call mode has occurred at step 504. The possible forms for the indication include, but are not limited to, a signal received from the processing unit 110, a signal received from the activation of a dedicated button on the body of communication device 100, or receipt of a particular key sequence from keypad 118 via user interface 128. Furthermore, the possible events may be user-defined or may be preprogrammed into either the client device 302 or the communication device 100.

At step 506, the client device 302 communicates the indication to the communication device 100. The client device 302 may communicate the indication to the communication device 100 in any capable form, including but not limited to a wireless technology, such as a short-range radio technology including Bluetooth, or a wired connection.

At step 508, the communication device 100 determines the presence corresponding to the event triggering active call mode. The presence associated with each event designed under active call mode may be stored in memory of the communication device 100, for example, with the presence and corresponding event stored as numerical values. The information regarding each presence associated with each event may also reside in an external memory. At step 510, the communication device 100 communicates the new presence to the client device 302, which in turn, communicates the new presence to the messaging server 106 via communications network 102. Method 500 concludes at step 512 after the instant messaging presence of communication device 100 is changed to the presence associated with the event triggering active call mode.

It will be apparent to those skilled in the art that various changes and modifications of an obvious nature may be made to the present invention, and all such changes and modifications are considered to fall within the scope of the appended claims. Other embodiments of this invention will be apparent to those skilled in the art from consideration of the specification and practice of the invention disclosed herein. It is intended that the specification and examples be considered as exemplary only, and within the scope and spirit of the invention as indicated in the description and the following claims.

I hereby claim:

1. A method of operating a wireless device in a communications network, comprising:
    initiating an active call mode in the wireless device, wherein the wireless device is a cellular telephone;
    associating a presence with the active call mode, the presence indicating the active call mode was initiated for one of receipt of a facsimile, involvement in a chat session, and receipt of an email;

automatically updating a user instant messaging profile with the presence, the user instant messaging profile logged into the wireless device such that instant messages are sent using the wireless device;

communicating the user instant messaging profile with the presence associated with the active call mode to the communication network for access by other users of the communication network, each other user having a personal list including the presence on a communication device;

automatically updating a user instant messaging profile with an idle presence when the active call mode has ended, the idle presence indicating that the wireless device is not in active call mode; and communicating the user instant messaging profile with the idle presence to the communication network for access by other users of the communication network.

2. The method of claim 1, wherein said automatically updating a user instant messaging profile includes storing the user instant messaging profile in a memory.

3. The method of claim 2, wherein said memory is coupled to the communications network.

4. The method of claim 2, wherein said memory is located within the wireless device.

5. The method of claim 1, wherein said cellular telephone is communicatively coupled to a client device.

6. The method of claim 1, further comprising the steps of:
updating the stored user instant messaging profile in response to termination of a voice call in the wireless device.

7. A non-transitory computer readable medium, said computer readable medium containing instructions to perform the steps of claim 1.

8. A system for operating a wireless communications network utilizing a wireless user device, comprising:
a processing unit resident in the wireless user device, wherein the wireless user device is a cellular telephone;
a memory accessible to said processing unit for storing user instant messaging profile information, the user instant messaging profile logged into the wireless user device such that instant messages are sent using the wireless device; and
a plurality of instructions executable by said processing unit for
automatically updating the stored user instant messaging profile with a presence in response to initiation of an active call mode in the wireless device, the instant messaging profile available for access by other users of the communication network in order to determine availability, each other user having a personal list including the presence on a communication device, the presence indicating the active call mode was initiated for one of a facsimile, involvement in a chat session, and receipt of an email, and
automatically updating the stored user instant messaging profile with an idle presence when the active call mode has ended, the idle presence indicating that the wireless device is not in active call mode.

9. The system of claim 8, wherein said system further comprises a network interface communicatively connected to said processing unit for transmitting user instant messaging profile information from the wireless device to the communications network.

* * * * *